United States Patent
Ali et al.

(10) Patent No.: US 8,953,474 B2
(45) Date of Patent: Feb. 10, 2015

(54) OPTIMIZED UPLINK PERFORMANCE VIA ANTENNA SELECTION

(75) Inventors: Shirook M. Ali, Milton (CA); Eoin Buckley, Grayslake, IL (US); Eswar Vutukuri, Hedge Hemp (GB); Werner Kreuzer, Berlin (DE)

(73) Assignee: BlackBerry Limited, Waterloo, Ontario (CA)

( * ) Notice: Subject to any disclaimer, the term of this patent is extended or adjusted under 35 U.S.C. 154(b) by 156 days.

(21) Appl. No.: 13/442,500

(22) Filed: Apr. 9, 2012

(65) Prior Publication Data
US 2013/0265890 A1    Oct. 10, 2013

(51) Int. Cl.
*H04L 12/26*   (2006.01)
*H04W 4/00*   (2009.01)

(52) U.S. Cl.
USPC ............... 370/252; 370/328; 370/339

(58) Field of Classification Search
None
See application file for complete search history.

(56) References Cited

U.S. PATENT DOCUMENTS

| | | | |
|---|---|---|---|
| 6,574,461 B1 * | 6/2003 | Skold | 455/277.2 |
| 7,620,130 B2 * | 11/2009 | Iwasaki et al. | 375/347 |
| 7,715,876 B2 * | 5/2010 | Nakao | 455/562.1 |
| 2003/0078075 A1 * | 4/2003 | McNicol | 455/562 |
| 2004/0185893 A1 | 9/2004 | Doi et al. | |
| 2009/0073062 A1 * | 3/2009 | Tang et al. | 343/703 |
| 2010/0008400 A1 | 1/2010 | Chari | |
| 2010/0329370 A1 * | 12/2010 | Hochwald et al. | 375/260 |
| 2011/0044218 A1 * | 2/2011 | Kaur et al. | 370/310 |
| 2012/0057535 A1 * | 3/2012 | Zhang et al. | 370/329 |
| 2012/0087401 A1 * | 4/2012 | Bhattad et al. | 375/224 |
| 2012/0142291 A1 * | 6/2012 | Rath et al. | 455/127.1 |
| 2012/0196549 A1 * | 8/2012 | Hsu et al. | 455/90.2 |
| 2012/0327804 A1 * | 12/2012 | Park et al. | 370/252 |

FOREIGN PATENT DOCUMENTS

EP    0889603 A2    1/1999

OTHER PUBLICATIONS

U.S. Appl. No. 61/315,014, Park et al., Enhanced Power Control Mechanism Using Uplink Channel Quality in Distributed Antenna System, Mar. 18, 2010, p. 4.*
Extended European Search Report for corresponding European Patent Application No. 13163011.3-1811/2650966, dated Mar. 14, 2014, pp. 1-7.

* cited by examiner

*Primary Examiner* — Ashley Shivers
(74) *Attorney, Agent, or Firm* — Cantor Colburn LLP

(57) ABSTRACT

Embodiments of the invention provide systems and methods for improving user equipment performance in up-link transmission by implementing antenna selection based on channel measurements in the down-link. In various embodiments, first and second antennas are used to receive signals on a downlink and to transmit signals on an uplink. A plurality of signals received on the downlink are used to generate a plurality of antenna parameter measurements derived from multiple correlations of a known reference sequence of data signals transmitted on the downlink. The plurality of antenna parameter measurements is then used to select either the first antenna or the second antenna or a combination of both through splitting of the signal for transmitting data signals by said user equipment device on the uplink.

32 Claims, 10 Drawing Sheets

OPTIMIZED UPLINK PERFORMANCE VIA ANTENNA SELECTION

BACKGROUND OF THE DISCLOSURE

1. Field of the Disclosure

The present disclosure is directed in general to communication systems and, more specifically, to systems and methods for real-time measurement of antenna performance.

2. Description of the Related Art

The term "multimode device" is often used loosely in the wireless industry in the context of describing a mobile device. Within the "Third-Generation Partnership Project" (3GPP) family of technologies, and specifically in the case of a "Long-Term Evolution" (LTE) multimode devices, this can mean support not only for LTE, but also both for "Wideband Code-Division Multiple Access" and "High Speed Packet Access" (WCDMA/HSPA) and also for "Global System for Mobile Communication" (GSM) or "Enhanced Data Rate for GSM Evolution" (EDGE) also in the same device.

As with any new wireless technology, building coverage takes time and typically starts in high-density metropolitan areas. Mature technologies such as GSM provide the backdrop for service continuity in areas not covered by LTE. Furthermore, even in LTE covered areas, GSM is likely to continue to be utilized at least in the initial stages of deployment when LTE may not offer full support for voice services. In such scenarios a second fallback access network such as GSM or "Universal Mobile Telecommunication systems" (UMTS) may be needed.

The coverage growth model as outlined above takes advantage of multimode devices. These devices provide the ability to grow coverage in the needed increments while allowing the operator to provide seamless interworking with more mature technologies in areas where LTE is not present. Additionally, a multimode, multiband device allows an LTE subscriber to roam worldwide in other networks which may not yet support the LTE technology, perhaps using the GSM/EDGE capability in the device eliminating impediments such as technology islands and regions of limited usability.

Since LTE Release 8 requires the support at least two antennas for downlink (DL) reception, it is possible that selection can also be made between these available antennas for UL transmission not only for LTE, but also for other available technologies in a multimode device, such as GSM.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
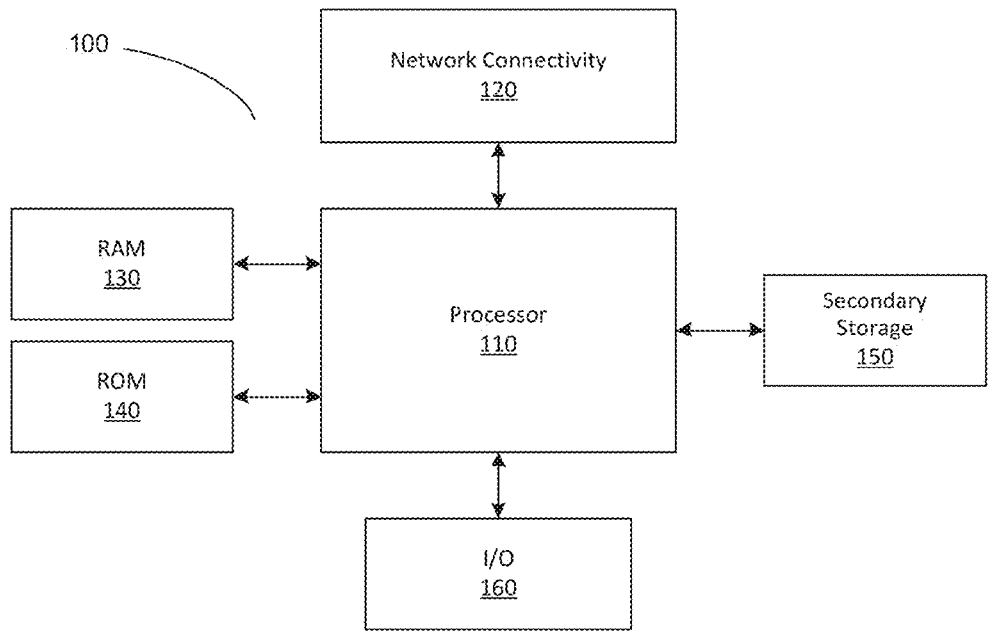
FIG. 1 depicts an exemplary system in which the present invention may be implemented.

Embodiments of the disclosure provide systems and methods for improving user equipment (UE) performance in up-link (UL) transmission by implementing antenna selection based on channel measurements in the down-link (DL), particularly for systems such as GSM/EDGE. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, a processor, a process running on a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, radio network controllers, home location registers, Gateway GPRS Support Nodes (GGSN), Serving GPRS Support Nodes (SGSN), Serving Gateways (S-GW), and Packet Data Network Gateways (PDN-GW).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
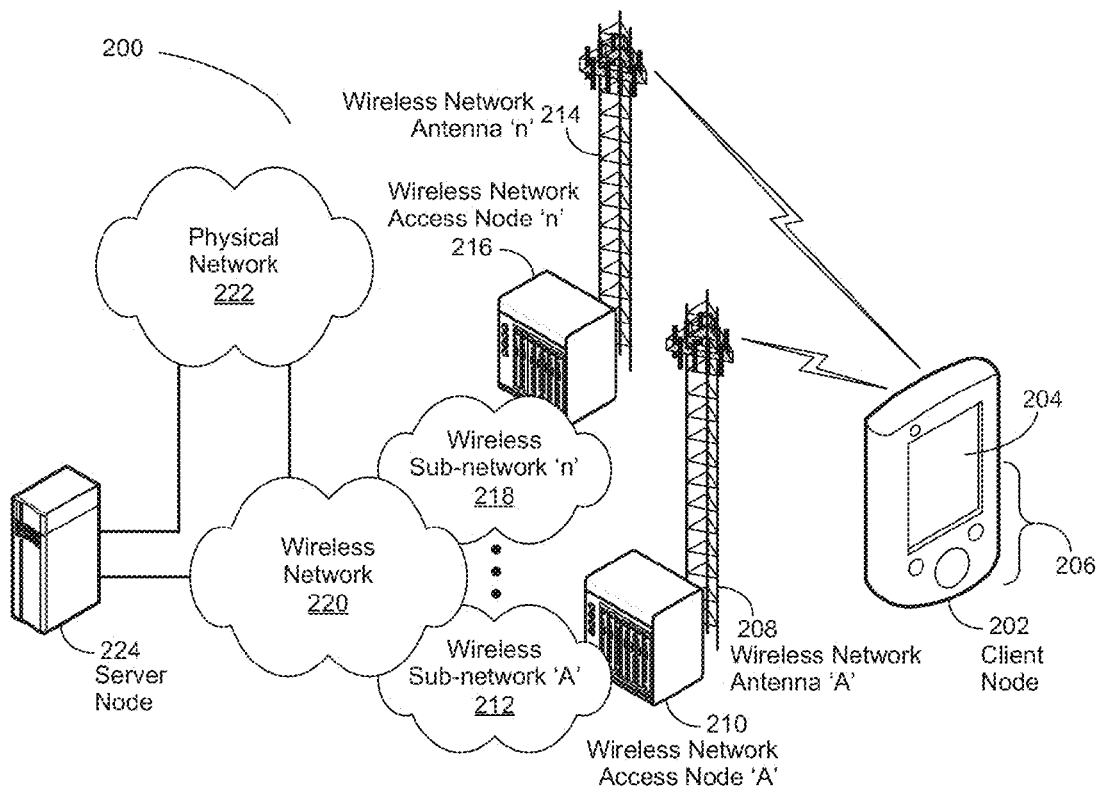
FIG. 2 shows a wireless-enabled communications environment including an embodiment of a client node.

FIG. 2 shows a wireless-enabled communications environment including an embodiment of a client node as implemented in an embodiment of the invention. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless network 212. Skilled practitioners of the art will recognize that many such embodiments are possible and the foregoing is not intended to limit the spirit, scope, or intention of the disclosure.

Figure 3:
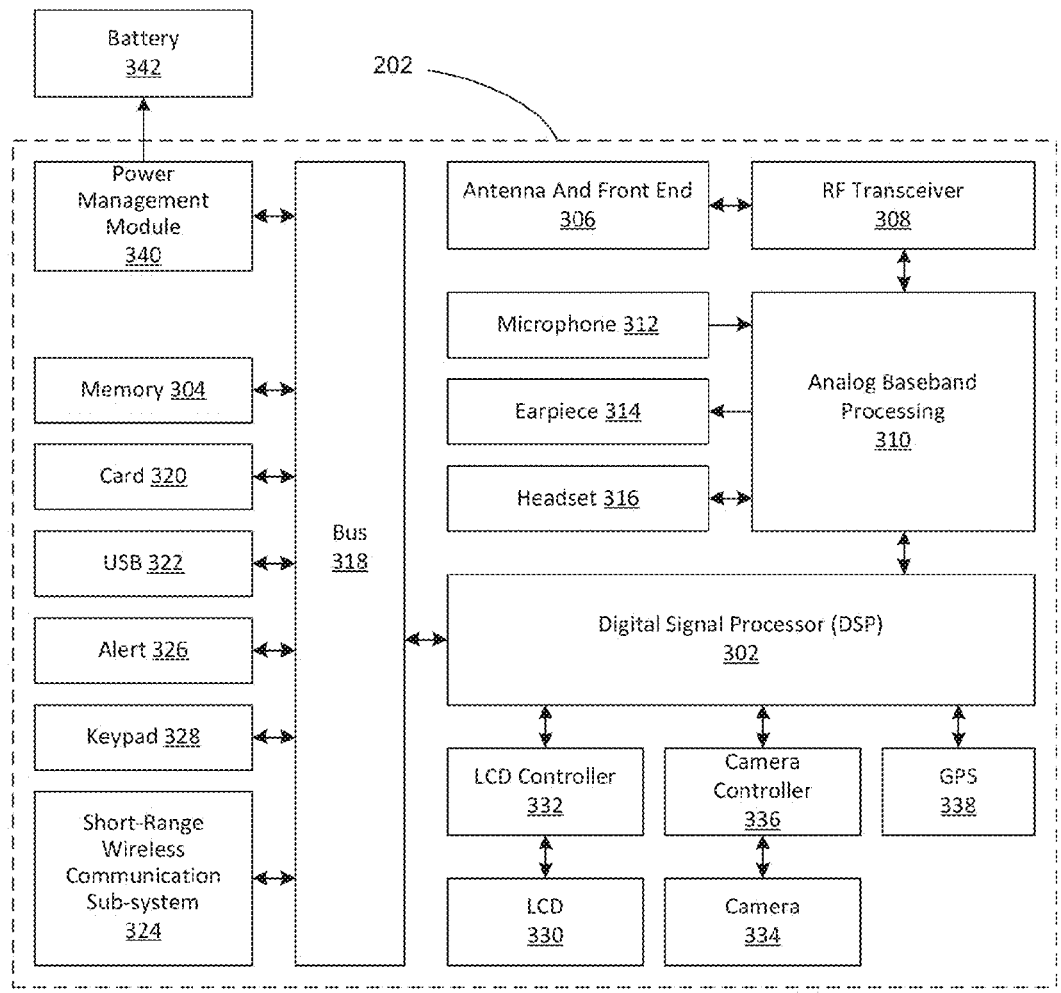
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the invention. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/dispreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. Various other peripherals may also be included to provide additional functions, such as radio and television reception.

Figure 4:
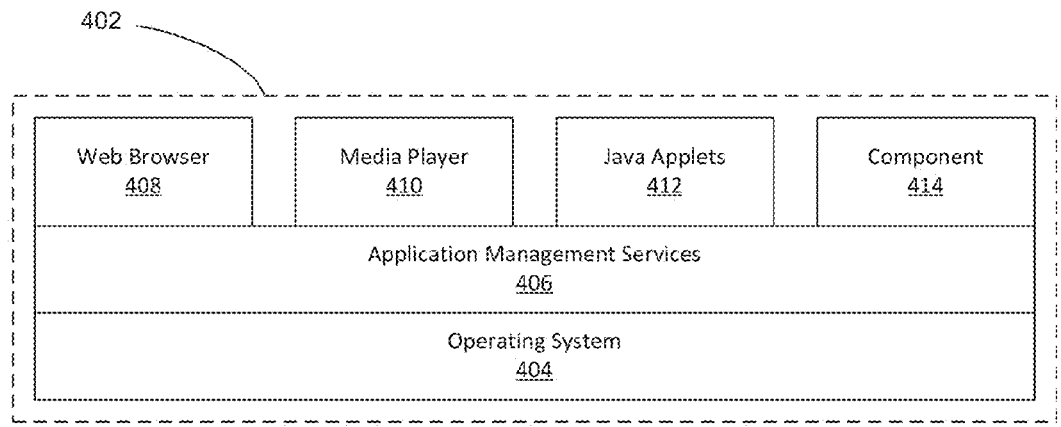
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A component 414 may provide functionality described herein. In various embodiments, the client node 202, the wireless network nodes 'A' 210 through 'n' 216, and the server node 224 shown in FIG. 2 may likewise include a processing component that is capable of executing instructions related to the actions described above.

As will be understood by those of skill in the art, antenna selection is an antenna diversity technique generally used to improve the quality and the reliability of a wireless link. The diversity comes from having the choice to transmit on antennas that experience different near-field environments due to, for example, the presence of the operating user and the close surroundings that may affect antenna performance. The propagation channel characteristics that each antenna interacts are likely be different from one antenna to another, thereby adding another factor to diversity as each of the antennas would experience different fading levels for the same usage scenario. In UL antenna selection, an UL signal is fed into one of several available antennas for UL transmission where the antenna selected is based on some optimization criterion.

Even if both antennas are identically designed and offer identical free space (FS) characteristics both for reception and transmission, it is highly probable that one of the antennas will offer a better long-term link performance in practical usage cases due to real-world effects such as hand(s) and/or head placement on the UE. Therefore, the goal is to select the antenna that provides better long-term UL performance in practical usage cases. Furthermore, under the assumption that real-world effects equally impact both UL and DL performance, DL measurements can be used in selecting the antenna for UL transmission.

Figure 5A:
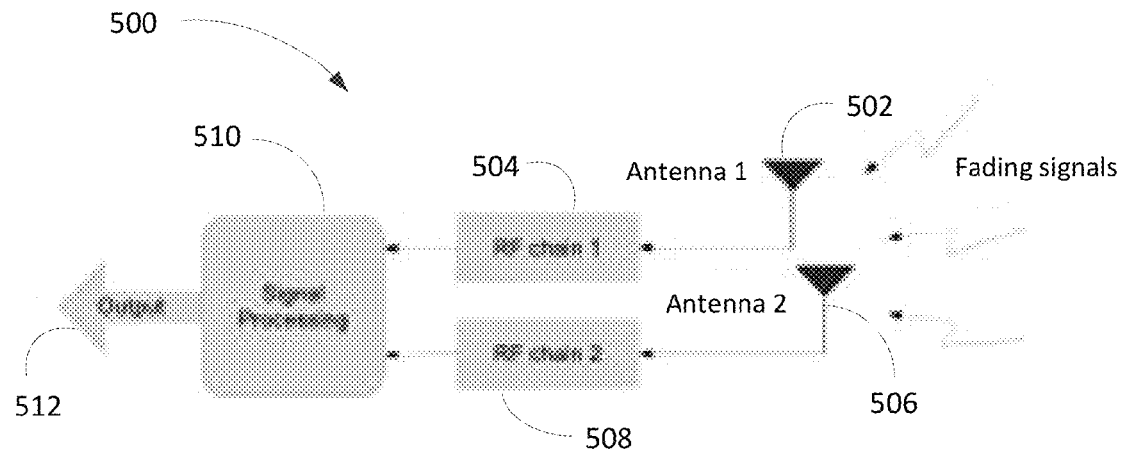
FIGS. 5a and 5b are generalized illustrations of communication systems for implementing antenna diversity techniques in accordance with embodiments of the present disclosure.
Figure 5B:
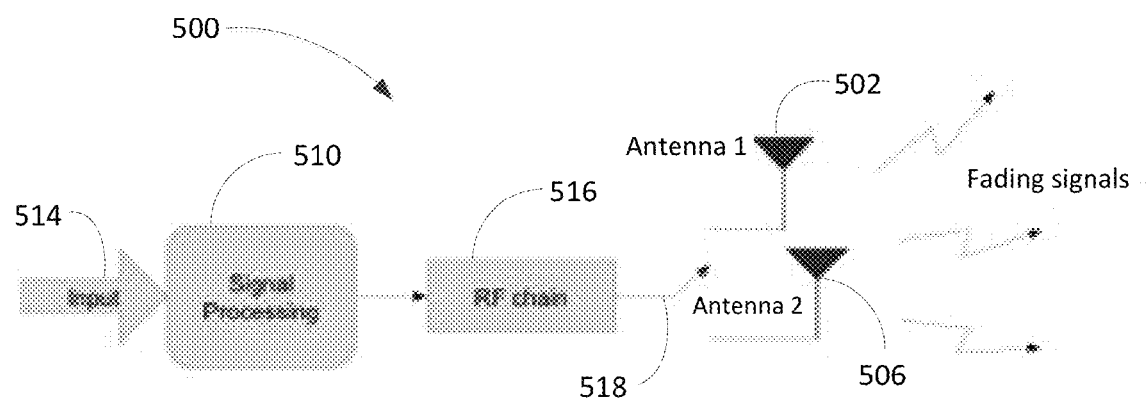

FIGS. 5a and 5b are generalized illustrations of communication systems for implementing antenna diversity techniques in accordance with embodiments of the present invention. Referring to FIG. 5a, a UE 500 comprises a first antenna 502 that receives fading signals and provides an input to a first RF chain 504 and a second antenna 506 that also receives fading signals and provides an input to a second RF chain 508. The RF chains 504 and 508 each process the input signals from the respective antennas and provide output signals that are then provided as inputs to a signal processing module 510. The signal processing module then processes these input signals and generates output signals 512 that are processed by the various signal processing modules discussed hereinabove in connection with FIGS. 1-4.

FIG. 5b is an illustration of the processing modules for transmitting uplink signals on one of the two antennas 502 or 506 shown in FIG. 5a. In this embodiment, input signals 514 are received by signal processing module 510 from the various modules shown in FIGS. 1-4 and an up-link signal is generated therefrom. The output signal from signal processing module 510 is processed by RF chain 516 to generate an up-link signal and that up-link signal is provided to a diversity switch that is connected to either antenna 502 or 506, depending on the outcome of processing steps discussed herein below.

As will be understood by those of skill in the art, two DL receive antennas 502 and 506 are described in 4G Long Term Evolution (LTE) Rel '8 as a requirement and in 3G UMTS as an optional feature. On the UL, however, the requirements are for transmission on a single antenna. The general assumption is that the UL transmission would always occur on the same antenna. In the various embodiments, such as those described above, the UE has a choice of transmission on either of the two antennas since the antennas 502 or 506 and their respective RF chains would already exist as per signal diversity requirements on the DL.

Because of reciprocity, the antenna radiation pattern is identical in the transmit mode to that of the receive mode. Hence, the imbalance measured in the DL and that in the UL would be identical, under the assumption of an equal transfer (channel) characteristic.

There are several benefits of UL antenna selection that can be realized by implementing embodiments of the present disclosure. For example, there is improvement in UL link performance as measured in the long term due to the imbalance in the UL performance between the two antennas on the UE. The imbalance is a measure of the relative difference in performance between the two antennas, i.e., how much one of the antennas is performing better or worse than the other antenna in a given usage scenario.

Figure 6:
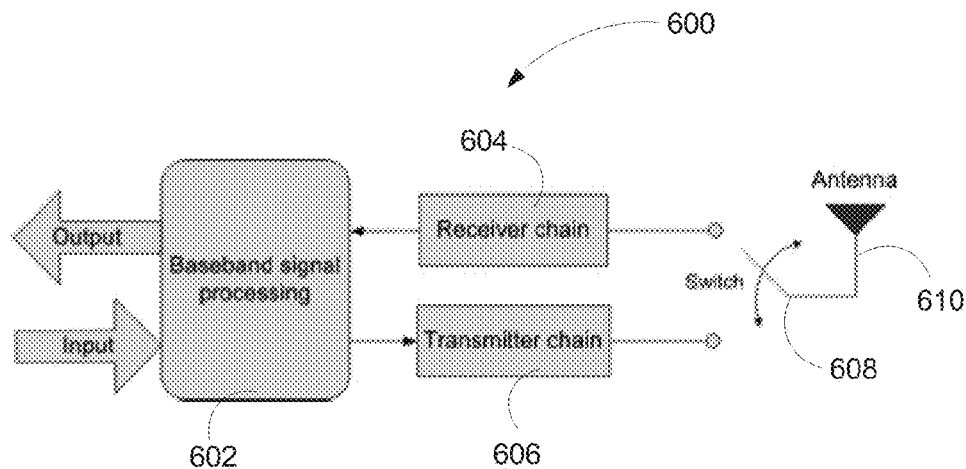
FIG. 6 is a block diagram of system components for a user equipment configured to support GSM/EDGE communication protocols.

FIG. 6 is a block diagram of system components for a user equipment 600 configured to support the traditional 2G GSM/EDGE communication protocols. The components comprise a baseband signal processing unit 602 that is operable to receive incoming signals from receiver chain 604 and to generate processed baseband output signals therefrom. The baseband signal processing unit is further operable to receive input signals and to generate processed baseband signals as an input to the transmitter chain 606. A switch 608 is operable to couple the antenna 610 to the receiver chain 604 or the transmitter chain 606, depending on whether the user equipment 600 is operating in receive or transmit mode.

As discussed above, LTE Rel '8 requires support for two antennas on the downlink. Since these antennas are available for LTE-enabled user devices, embodiments of the disclosure hereinbelow will describe how both antennas can also be used to GSM/EDGE communication protocols.

Figure 7:
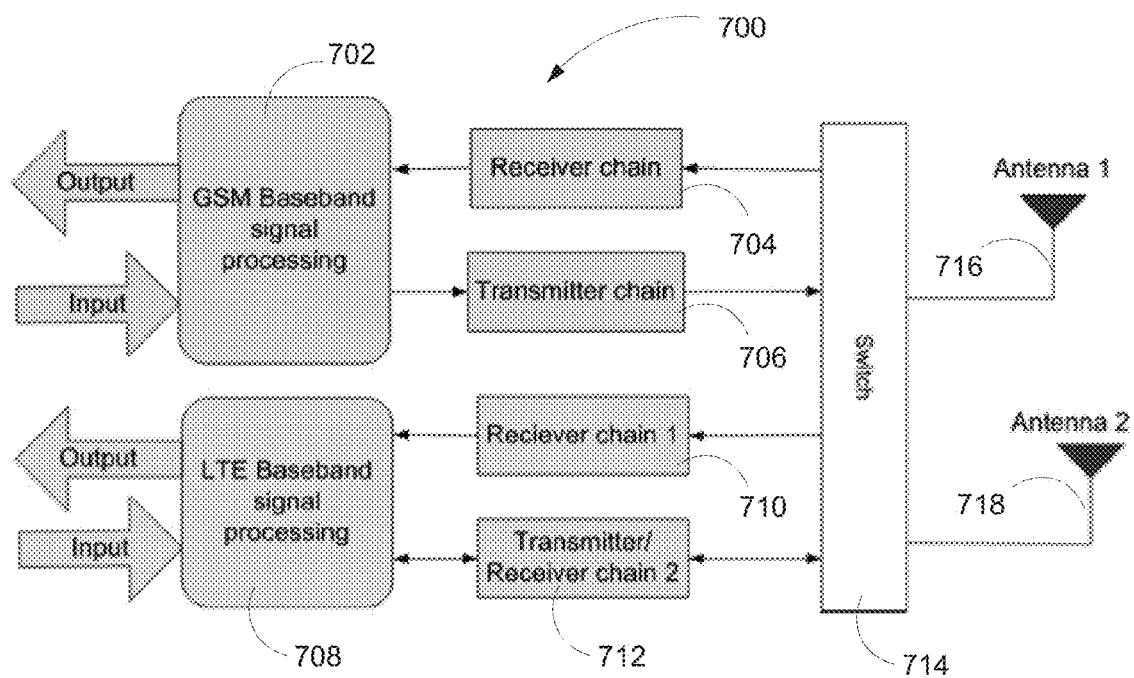
FIG. 7 is a block diagram of a multimode-multiband user equipment configured to use multiple antennas to support both LTE and GSM/EDGE communication protocols.

FIG. 7 is a block diagram of a multimode-multiband user equipment 700 configured to use multiple antennas to support both LTE and GSM/EDGE communication protocols. The GSM/EDGE portion comprises a GSM/EDGE baseband signal processing unit 702 that is operable to receive incoming signals from receiver chain 704 and to generate processed baseband output signals therefrom. The baseband signal processing unit is further operable to receive input signals and to generate processed baseband signals as an input to the transmitter chain 706. Likewise, the LTE portion comprises a LTE baseband signal processing unit 708 that is operable to receive incoming signals from receiver chain(1) 710 and from transmitter/receiver chain(2) 712 and to generate processed baseband output signals therefrom. The baseband signal processing unit 708 is further operable to receive input signals and to generate processed baseband signals as an input to the transmitter/receiver chain(2) 706. A switch 714 is operable to couple antennas 716 and 718 to the various receiver and transmitter chains depending on whether the user equipment is operating in LTE mode or GSM/EDGE mode. When the user equipment is operating in LTE mode, antennas 716 and 718 are both used by the LTE portion to receive downlink transmissions and one of the antennas is used for uplink communications. When the user equipment 700 is operating in GSM/EDGE mode, one of the antennas 716, 718 is used for signal transmission.

Before discussing additional embodiments of the invention, important aspects of antenna performance will be discussed in connection with the implementation of various embodiments disclosed herein. As will be understood by those of skill in the art, an antenna is a transducer element that converts electromagnetic waves into electrical currents and vice-versa. An antenna is selected for a particular application based on its resonance at a specific frequency of interest, f, where its performance is maintained throughout a desired bandwidth. Resonance is achieved with an electrical length of the antenna related to fractions of its wavelength λ, depending on the type of antenna. Generally, the antenna structure resonates at multiples of this electrical length as governed by the currents distributed on its surface. For example, an antenna that is designed for resonance at $\lambda_0/2$, with $\lambda_0/2$ being the electrical length at the lowest frequency of interest $f_L$, will also resonate at multiples of $f_L$. Therefore, multi-band operations, such as those described in connection with the various embodiments disclosed herein, can be supported by the same antenna structure.

In practice, each band of interest is supported by its own transceiver. In this case, a switching network is required to switch between the single antenna port to the active transceiver. In some scenarios, such as in GSM, this means the switching is between the transmitter chain and the receiver chain within the same frequency band. For technologies operating simultaneously with other technologies, such as the case of having GSM/EDGE and LTE active at the same time while using the same antenna structure, it is necessary for the antenna to have multiple ports/feeds. Each port/feed is connected to a respective transceiver in the user equipment device.

The antenna selection mechanism used in various embodiments of the invention is implemented by selecting the better performing antenna for uplink transmission based on channel quality measurements in the downlink. This is based on the assumption that the long-term statistics of the uplink and the downlink channels characterize equivalently. From an antenna perspective, this assumption is theoretically valid based on the reciprocity feature that the antenna enjoys in its transmitting and receiving radiation patterns.

The implementations for various embodiments disclosed herein for antenna diversity by means of antenna selection in the uplink will now be discussed for 2G GSM/EDGE technologies. The discussion discloses multiple embodiments taking into account various implementations with different transceiver options and the related signaling and the measurement procedures.

Single RF Transmitter Chain and Single RF Receiver Chain with Two Antennas:

This is the typical conventional GSM transceiver with a transmit chain and a receive chain, such as the embodiment shown above in FIG. 6. In case of a user equipment device supporting LTE, there is typically a second antenna, such as shown in FIG. 7; the second antenna is generally used mainly to support LTE functionality. However, for cost reasons, the second antenna typically has the full RF transmit or receive chains. In this case, the performance imbalance between the antennas should be measured sequentially. The port of the selected antenna (with higher Rx power) may then be connected to the transmitter chain for UL transmission through a switch.

Figure 8:
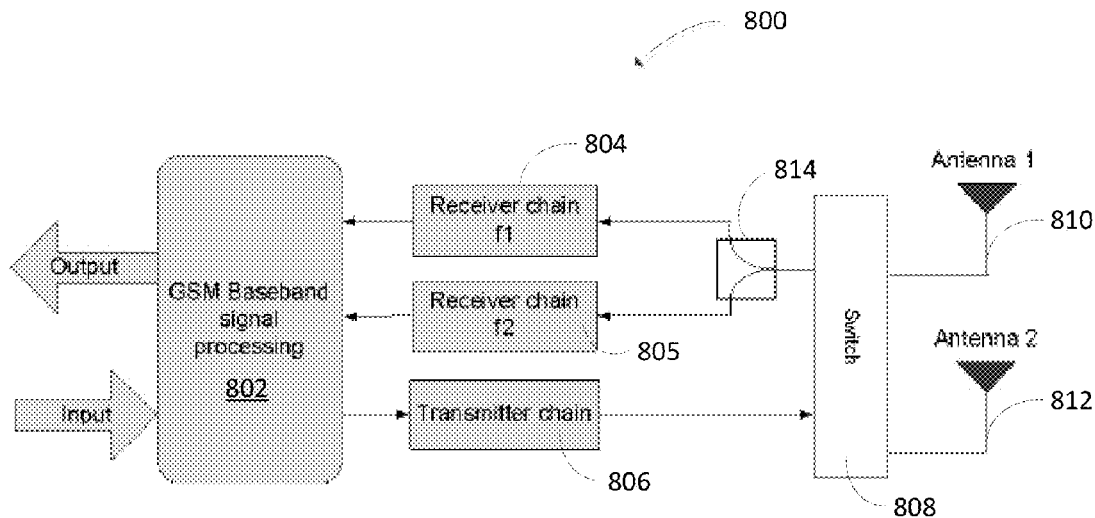
FIG. 8 is an illustration of a user equipment device configured to operate as a Downlink Dual-Carrier system.

Two Receive RF Chains and a Single Transmitter Chain with Two Antennas—Downlink Dual-Carrier (DLDC) System:

In a DLDC system, reception is made simultaneously on two receivers at two different carrier frequencies, $f_1$ and $f_2$. FIG. 8 is an illustration of a user equipment device 800 configured to operate as a DLDC system. The user equipment comprises a GSM/EDGE baseband signal processing unit 802 that is operable to receive incoming signals from receiver chains 804 and 805, operating at different frequencies, and to generate processed baseband output signals therefrom. The baseband signal processing unit 802 is further operable to receive input signals and to generate processed baseband signals as an input to the transmitter chain 806. A switch 808 is operable to couple antennas 810 and 812 to the various receiver and transmitter chains, depending on whether the user equipment device 800 is operating in transmit mode or receive mode. The feeds for receiver chains 804 and 805 are provided by a splitter 814 that is coupled to a single port of the antenna, e.g., antenna 808. The second antenna, e.g., antenna 810, in this embodiment typically is used to support the LTE functionality.

In this embodiment again, a performance measurement on both antennas needs to be conducted sequentially (as discussed above). However, this embodiment makes it possible to take two samples per measurement instance. Depending on the targeted level of accuracy and the measured quantity (i.e., either received signal power or received signal power for the user), this can be used to reduce the number of downlink power measurement instances needed to accurately select an antenna for uplink transmission.

Figure 9:
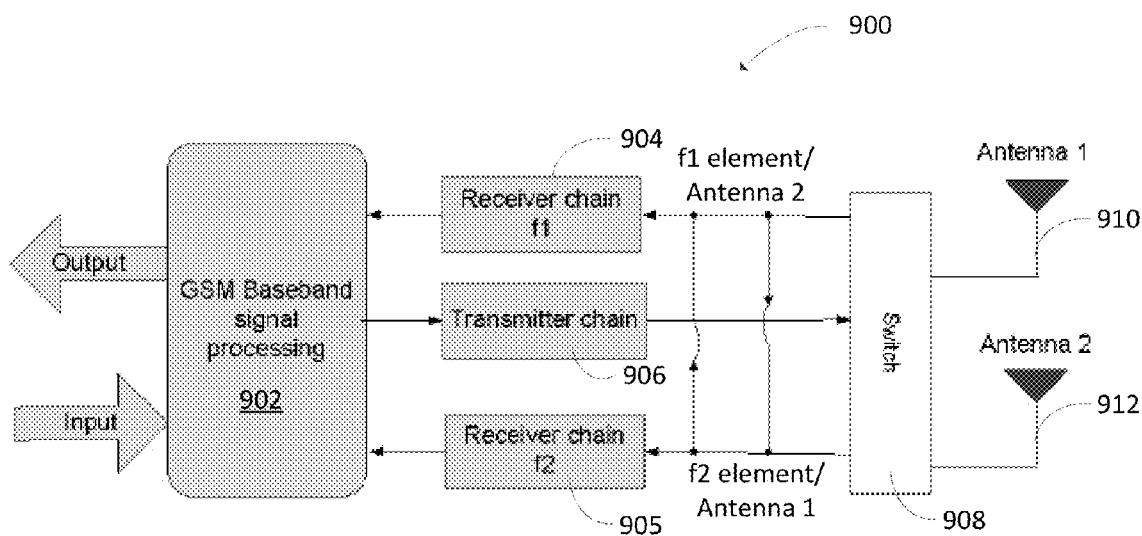
FIG. 9 is an illustration of a user equipment device configured to operate as a Dual Carrier Diversity reception system using two antennas in the receive mode.

MSRD with DLDC System:

This system comprises a Dual Carrier Diversity reception system using two antennas in the receive mode. Referring to FIG. 9, this embodiment comprises a user equipment device 900 comprising a GSM/EDGE baseband signal processing unit 902 that is operable to receive incoming signals from receiver chains 904 and 905, operating at different frequencies, and to generate processed baseband output signals therefrom. The baseband signal processing unit 902 is further operable to receive input signals and to generate processed baseband signals as an input to the transmitter chain 906. A switch 908 is operable to couple antennas 910 and 912 to the various receiver and transmitter chains depending on whether the user equipment device 900 is operating in transmit mode or receive mode.

Both antennas are designed to have good performance in the frequency band f'-f", where the two closely spaced carrier frequencies $f_1$ and $f_2$ are within the frequency band f'-f". After the antenna terminals, the signal is split and is fed to each of two RF receive chains. Each receive chain, therefore, receives two simultaneous instances of the received signals at $f_1$ and $f_2$ which have been received by different antennas, i.e., antennas 910 and 912, thereby providing diversity of the received dual carrier signals.

In this case, the DL measurements on both antennas can be made at the same time. In fact, the measurements are more accurate, since two measurement instances are made per antenna in one measurement period. Once the better antenna is identified, the transmitter chain could be connected to that antenna for the uplink.

Blind Switching Between Antennas:

In scenarios where obtaining meaningful channel information or antenna performance from the baseband modem is not feasible, some benefit is still possible when blindly switching between the available antennas in coverage limited conditions, i.e., without any selection criteria. Antennas designed with minimal imbalance in free space generally facilitate better blind selection performance. Any of the embodiments discussed above with regard to FIG. 6, 8, or 9 are candidates for this blind selection approach. The gain in blind selection comes from the fact that on an average it is better to select the bad antenna on 50% of bits within a given channel code word rather than sending 50% of the channel code words on a bad antenna all the time. Typically, when the channel code rate is low (i.e., high redundancy), the embodiment discussed above provides a significant advantage in antenna selection.

Figure 10:
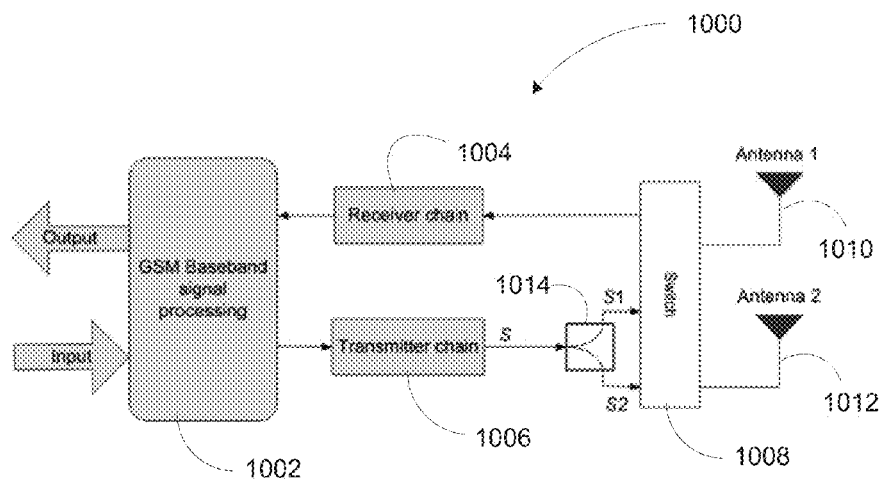
FIG. 10 is an illustration of a user equipment device configured to operate as a user equipment device using two antennas for uplink transmission.

Signal Split Transmission Between Antennas:

This embodiment still assumes the use of only one transmitter chain, but both antennas are utilized for the UL transmission. This embodiment is illustrated in FIG. 10. The user equipment 1000 comprises a GSM/EDGE baseband signal processing unit 1002 that is operable to receive incoming signals from receiver chain 1004 and to generate processed baseband output signals therefrom. The baseband signal processing unit 1002 is further operable to receive input signals and to generate processed baseband signals as an input to the transmitter chain 1006. A switch 1008 is operable to couple antennas 1010 and 1012 to the various receiver and transmitter chains depending on whether the user equipment device 1000 is operating in transmit mode or receive mode. A splitter 1014 is used to split the transmitted signals S into the two singles S1 and S2, where each is fed into an antenna for UL transmission. Although the uplink transmit diversity is known, in this embodiment, the transmitted power is split between the two uplink antennas based on the downlink measurements for each antenna. The power for S1 and S2 need not be the same and can adaptively change based on the downlink power measurements. One advantage of this embodiment is that since the same total radiated power is sent from two antennas in the uplink, the SAR requirements are easier to meet.

Measuring Imbalance:

In these embodiments, the selection decision between the two antennas is based on the measure of the imbalance between their performances. Two embodiments are discussed herein. In the first embodiment, the imbalance is measured before analog-to-digital conversion, i.e., before baseband. The imbalance between the antennas can be measured early in the transceiver chain right at the antenna terminals as a means of indirect power detection. This provides a fast intuitive selection of the better performing antenna. For example, measuring the real-time input antenna impedance in the downlink can be used to obtain a quick indication of the better antenna.

In another embodiment, the imbalance measurement is made after analog-to-digital conversion, at baseband. Downlink imbalance can be measured at baseband through estimation of the mean desired user power received at each antenna. That is, assuming the difference in desired user power between the two antennas is measured as XdB on the downlink, it can be assumed the same imbalance exists in the uplink direction and the better antenna is selected for UL transmission. On an average, an estimate of the desired user power can be made by correlating the training sequence with the received signal at each channel tap delay and estimating the channel power at each delay while accounting for noise mitigation achieved by the correlation process. The performance of this approach is detailed in the later section on "Probability of selecting the better performing antenna."

Figure 11:
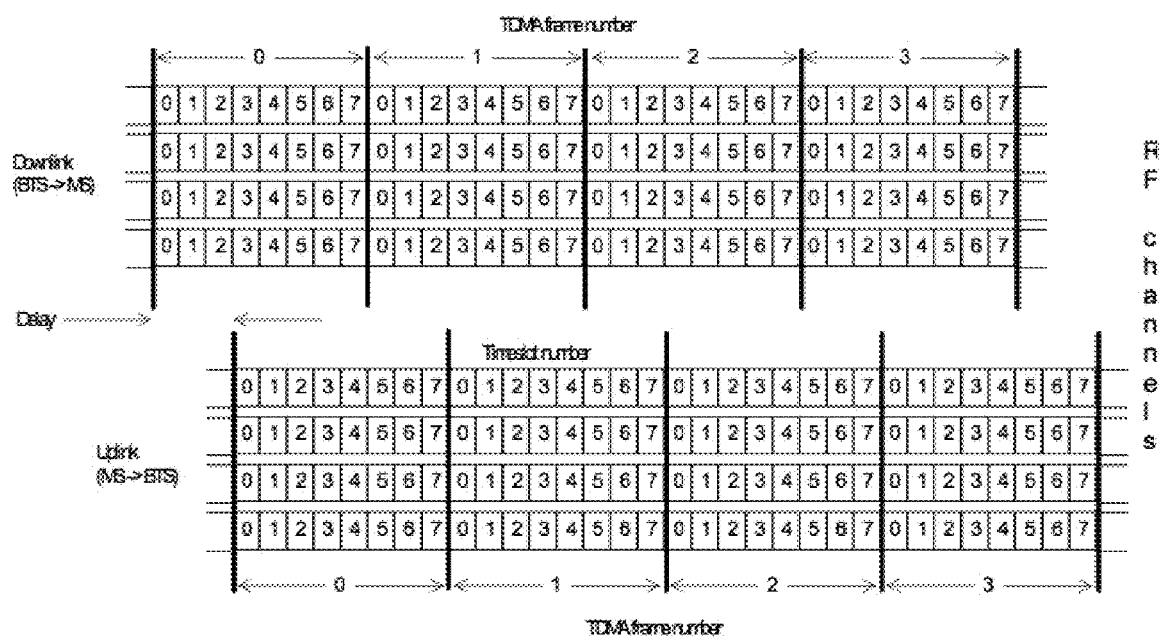
FIG. 11 is an illustration of uplink and downlink slots in a GSM system.

Antenna Power Measurement:

FIG. 11 shows an illustration of a UL and DL slots in a GSM system. In this example, 4 RF channels are present in the cell shown in FIG. 11. For a given speech call for instance, one time slot (for example time slot number 0) in each TDMA frame is used. For full rate speech, this would mean that the UL and DL time slot number 0 would be used. When frequency hopping is used, the carrier frequencies in UL and DL that are used for transmission/reception of the UL and DL timeslots are changed at the TDMA frame boundary.

It should be noted that a constant delay of around 3 timeslots exists between a given DL slot and the corresponding UL slot. In addition, it should be noted that the constant offset between uplink and downlink slots is reduced by the amount of timing advance in the UL. Two embodiments will now be disclosed for selecting the best possible antenna for uplink transmissions depending on the mobile station architecture:

Embodiment 1

Mobile Station Supporting Receive Diversity

In this embodiment, measures are made of the quality of reception on downlink for each RX antenna. This can be done by measuring the power or alternatively, the desired user power received at each downlink antenna port over a predetermined measurement period, e.g., two seconds. The antenna with the highest received power for transmission after this measurement period can then be selected for uplink transmissions.

Embodiment 2

Mobile Station with Two Antenna but Single RF Chain

In this embodiment, a moving average of the received power for each downlink is calculated and the antenna with the best average received power is used for transmission in the uplink. In this embodiment, the averaging can be done in such a way that more recent samples are given more weight. These measurements can also be made during the timeslots available between the assigned slots (on which speech data is transmitted or received) in consecutive TDMA frames.

As will be understood by those of skill in the art, without UL antenna selection one of the two available antennas would be designated the primary antenna and all UL transmissions would always occur on that antenna. The benefit of antenna selection, therefore, is in the use cases where the primary antenna is not in fact the better performing antenna due to real-world effects. In such cases by selecting the non-primary but better performing antenna for UL transmission, a link performance improvement equal to the difference in UL performance between the non-primary and primary antennas can be achieved. Embodiments for implementing antenna selection will be discussed in greater detail herein below.

Data:

For a packet data call, one or more UL and or DL timeslots may be assigned for transmission or reception to a given mobile station. Not all assigned uplink timeslots will actually be used for transmission at a given time. In order to transmit, the network needs to allocate the resource to the mobile station by sending the USF. A USF in the DL grants UL resource to a given mobile station in the next radio block period (i.e., 20 ms later). The MS can measure the downlink RX power as detailed in the previous section. The MS can then use detection of its own USF in the previous radio block period as a trigger to determine the better antenna for UL transmission based on a suitable averaging of previous DL measurements.

Probability of Selecting the Better Performing Antenna

Figure 12A:
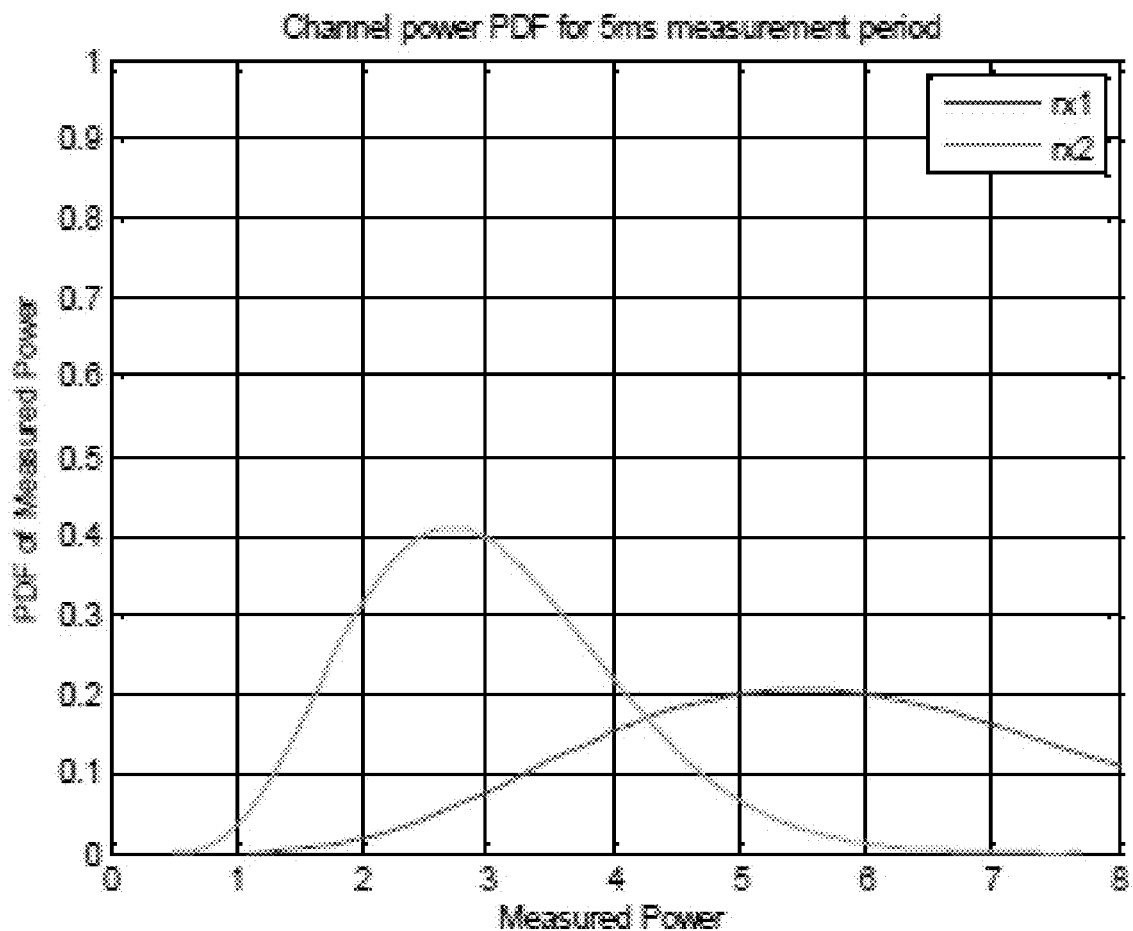
FIGS. 12a and 12b are graphical illustrations of a power density function for an example two antenna system.
Figure 12B:
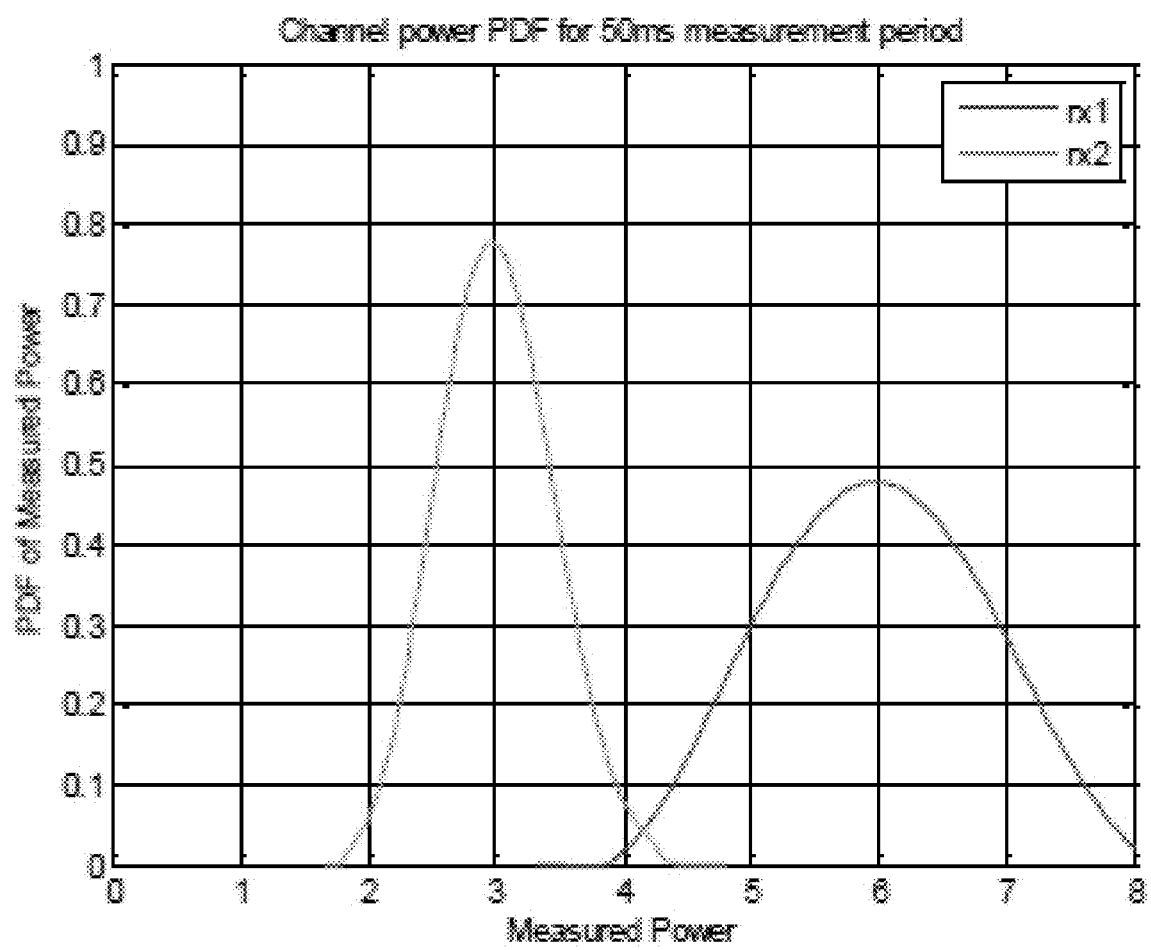

FIGS. 12a and 12b are graphical illustrations of details of the PDF of channel power at each antenna assuming a 3 dB antenna gain imbalance for 50 ms and 5 ms measurement periods, respectively. Simulations assumed a typical urban channel and mobile station speed of 5 kmph with ideal frequency hopping. Although there is significant overlap between the two distributions for the 5 ms measurement period case, the greater accuracy obtained over the 50 ms measurement period is reflected not only in a lower variance but also in a smaller area and therefore improved accuracy in antenna selection.

Figure 13A:
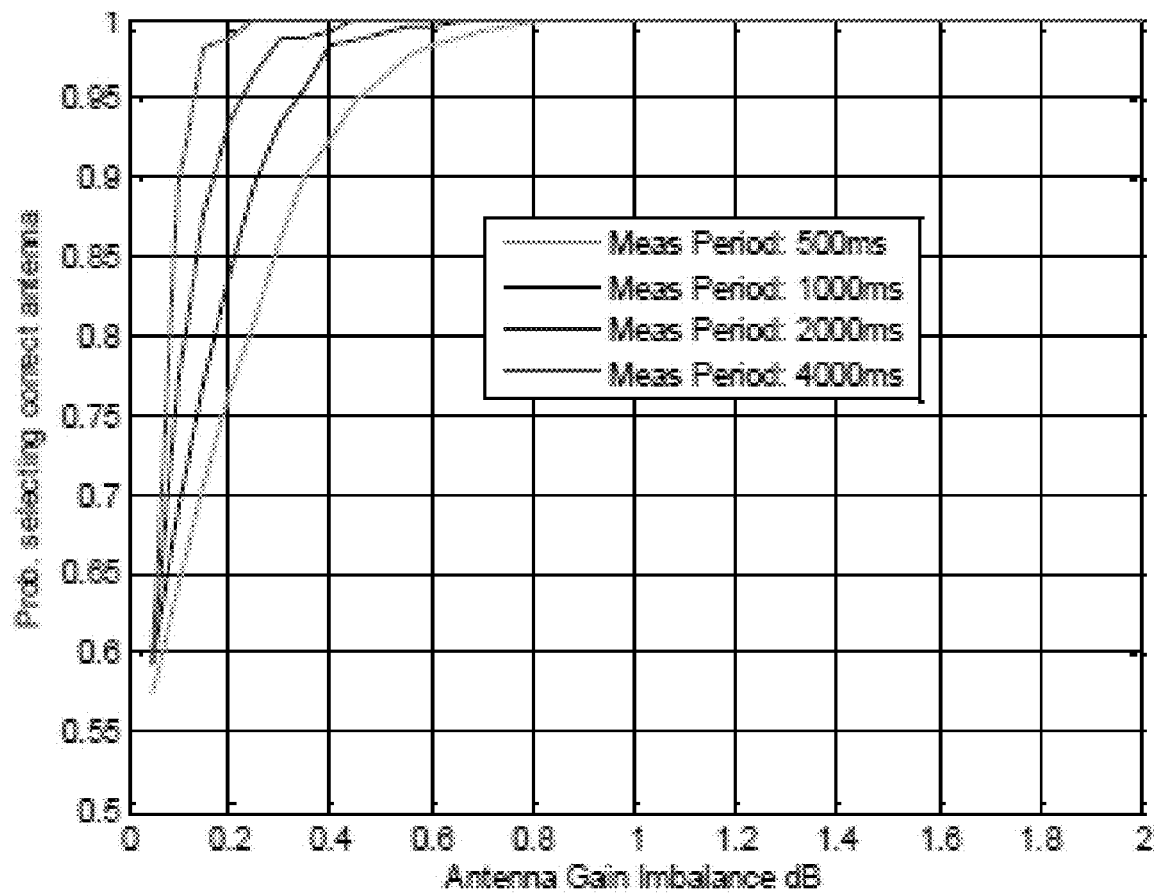
FIGS. 13a and 13b are graphical illustrations probability of selecting the correct uplink antenna for various differences in performance between the two uplink antennas.
Figure 13B:
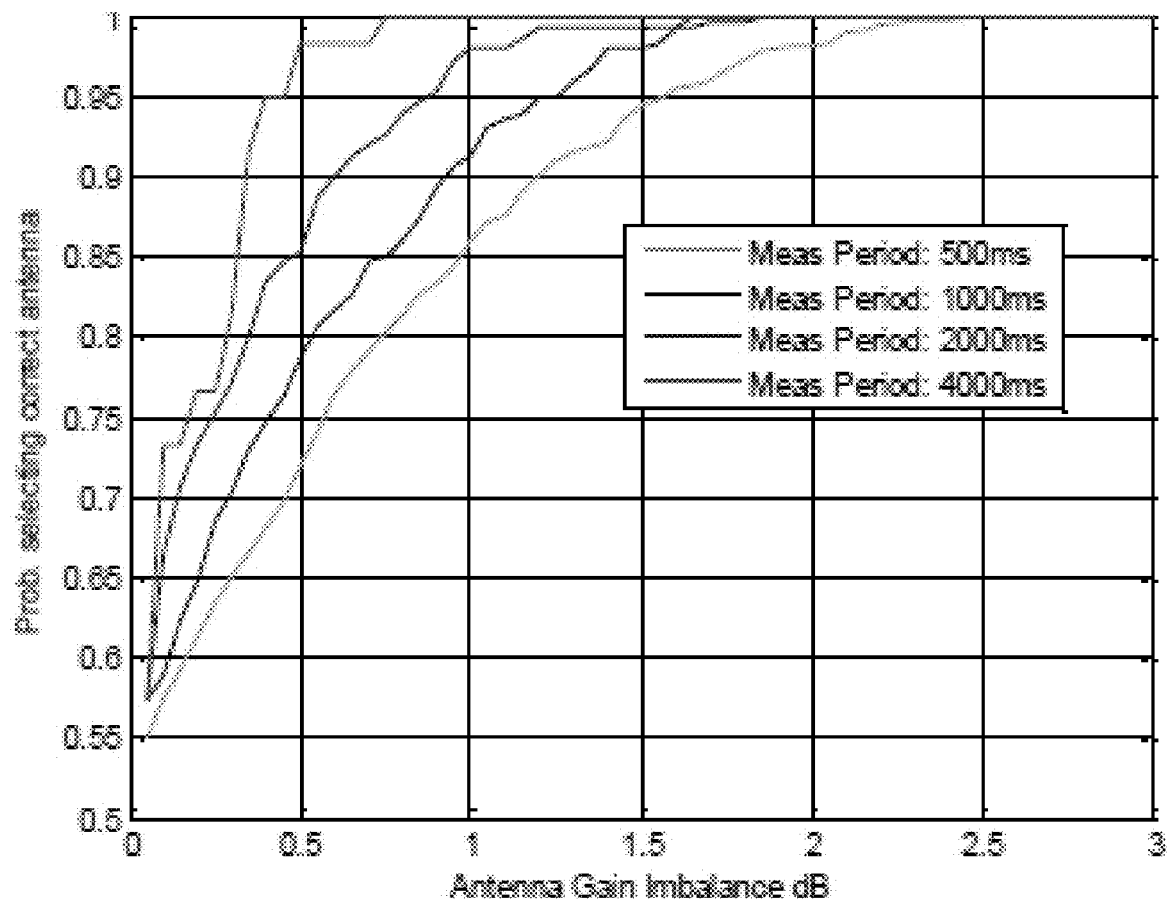

FIGS. 13a and 13b are graphical illustrations of the probability of selecting the correct UL antenna for various differences in performance between the two UL antennas indicated as antenna gain imbalance for various DL measurement periods both with and without frequency hopping. As an example, consider the green curve in FIG. 13b, indicating performance of a 0.5 second (500 ms) measurement period. Assuming an antenna gain imbalance of 0.5 dB, FIG. 13b indicates that 55% of the time the better performing antenna is selected and consequently 25% of the time the poorer performing antenna is selected.

Simulations for FIGS. 13a and 13b were carried out over a Typical Urban channel (TU) at 5 kmph speed and SNR of 30 dB at 1950 MHz carrier frequency. FIGS. 13a and 13 assume one DL measurement instance is available for each antenna in each TDMA frame. From these figures it can be seen that a measurement period on the order of 2-4 seconds is necessary in order to reliably predict the better performing UL transmit antenna for antenna gain imbalances less than 1 dB in the no frequency hopping scenario.

In the case of ideal frequency hopping, a much-reduced measurement period is necessary due to independence between measurements at each carrier frequency. In this case, a measurement period on the order of 0.5 seconds is sufficient to accurately predict the better performing UL transmit antenna.

The evolution of modern cellular standards has led to the required UE support of multiple antennas for DL reception with only a single antenna for uplink transmission for technologies such as LTE. Within the context of LTE, antenna selection can not only provide uplink benefits at the link level by detecting imbalances in performance between the available antennas in the downlink, but can also aid in maintaining compliance with FCC regulations on Specific Absorption Rates.

The present disclosure is not necessarily limited to the example embodiments which illustrate inventive aspects that are applicable to a wide variety of applications. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A wireless user equipment device, comprising:
first and second antennas;
processing logic operable to:
use said first and second antennas to receive signals on a downlink and to transmit signals on an uplink;
process a plurality of said received signals on said downlink to generate a plurality of antenna parameter measurements derived from multiple correlations of a known reference sequence of data signals transmitted on said downlink;
use said plurality of antenna parameter measurements to select said first antenna or said second antenna for transmitting data signals by said user equipment device on said uplink; and
use an offset corresponding to a power difference favoring said first or second antenna to select said first antenna or said second antenna for transmitting data signals by said user equipment device on said uplink, wherein said offset is signaled to the user equipment device,
wherein a ratio of transmitted signal power between said first and second antennas is variable during a predetermined time interval, and
wherein the ratio of the transmitted signal power between said first and second antenna is determined by the usage mode of the user equipment device.

2. The wireless user equipment device of claim 1, wherein said processing logic averages said antenna parameter measurements over a plurality of data subframes.

3. The wireless user equipment device of claim 1, wherein said plurality of antenna parameter measurements are sequentially conducted on said first antenna and said second antenna.

4. The wireless user equipment device of claim 1, wherein said plurality of antenna parameter measurements are simultaneously conducted on said first antenna and said second antenna.

5. The wireless user equipment device of claim 1, wherein the processing of said received signal on said downlink further comprises computing desired user power or total received signal power.

6. The wireless user equipment device of claim 5, wherein said first and second antenna share one radio frequency receiver chain for receiving said signals on said downlink.

7. The wireless user equipment device of claim 1, wherein said first and second antenna share one radio frequency receiver chain for receiving said signals on said downlink.

8. The wireless user equipment device of claim 1, wherein said data signals received on said downlink are received using a first radio access technology and said data signals transmitted on said uplink are transmitted using a second radio access technology.

9. A wireless user equipment device, comprising:
first and second antennas;
processing logic operable to:
  use said first and second antennas to receive data signals on a downlink and to transmit data signals on an uplink, wherein said data signals received on said downlink are received on a first set of multiple carrier frequencies and said data signals transmitted on a second set of multiple carrier frequencies;
  process a plurality of said received signals on said downlink to generate a plurality of antenna parameter measurements derived from multiple correlations of a known reference sequence of data signals transmitted on said downlink;
  use said plurality of antenna parameter measurements to select said first antenna or said second antenna for transmitting data signals by said user equipment device on said uplink; and
  use an offset corresponding to a power difference favoring said first or second antenna to select said first antenna or said second antenna for transmitting data signals by said user equipment device on said uplink, wherein said offset is signaled to the user equipment device,
wherein a ratio of transmitted signal power between said first and second antennas is variable during a predetermined time interval, and
wherein the ratio of the transmitted signal power between said first and second antenna is determined by the usage mode of the user equipment device.

10. The wireless user equipment device of claim 9, wherein said processing logic averages said antenna parameter measurements over a plurality of data subframes.

11. The wireless user equipment device of claim 9, wherein the processing of said received signal on said downlink further comprises computing desired user power or total received signal power.

12. A wireless user equipment device, comprising:
first and second antennas;
processing logic operable to:
  use said first and second antennas to receive signals on a downlink;
  process a plurality of said received signals on said downlink to generate a plurality of antenna parameter measurements derived from multiple correlations of a known reference sequence of data signals transmitted on said downlink; and
  use said first and second antennas to transmit data signals on an uplink, wherein said plurality of antenna parameter measurements are used by said processing logic to split transmitted signal power between said first and second antenna;
wherein the ratio of transmitted signal power between said first and second antennas is variable during a predetermined time interval, and
wherein the ratio of the transmitted signal power between said first and second antenna is determined by the usage mode of the user equipment device.

13. The wireless user equipment device of claim 12, wherein said processing logic averages said antenna parameter measurements over a plurality of data subframes.

14. The wireless user equipment device of claim 12, wherein the ratio of transmitted signal power between said first and second antennas is fixed during a second predetermined time interval.

15. The wireless user equipment device of claim 12, wherein the ratio of transmitted signal power between said first and second antennas is determined based on desired received power on said first antenna and said second antenna.

16. The wireless user equipment device of claim 12, wherein the ratio of the transmitted signal power between said first and second antenna is determined by predetermined specific absorption rate parameters.

17. A method for using a wireless communication device, comprising:
using processing logic to:
  use first and second antennas to receive signals on a downlink and to transmit signals on an uplink;
  process a plurality of said received signals on said downlink to generate a plurality of antenna parameter measurements derived from multiple correlations of a known reference sequence of data signals transmitted on said downlink;
  use said plurality of antenna parameter measurements to select said first antenna or said second antenna for transmitting data signals by said communication device on said uplink; and
  use an offset corresponding to a power difference favoring said first or second antenna to select said first antenna or said second antenna for transmitting data signals by said communication device on said uplink, wherein said offset is signaled to the communication device,
wherein a ratio of transmitted signal power between said first and second antennas is variable during a predetermined time interval, and
wherein the ratio of the transmitted signal power between said first and second antenna is determined by the usage mode of the user equipment device.

18. The method for using a wireless communication device of claim 17, wherein said processing logic averages said antenna parameter measurements over a plurality of data subframes.

19. The method for using a wireless communication device of claim 17, wherein said plurality of antenna parameter measurements are sequentially conducted on said first antenna and said second antenna.

20. The method for using a wireless communication device of claim 17, wherein said plurality of antenna parameter measurements are simultaneously conducted on said first antenna and said second antenna.

21. The wireless user equipment device of claim 17, wherein the processing of said received signal on said downlink further comprises computing desired user power or total received signal power.

22. The method for using a wireless communication device of claim 21, wherein said first and second antenna share one radio frequency receiver chain for receiving said signals on said downlink.

23. The method for using a wireless communication device of claim 17, wherein said first and second antenna share one radio frequency receiver chain for receiving said signals on said downlink.

24. The method for using a wireless communication device of claim 17, wherein said data signals received on said downlink are received using a first radio access technology and said data signals transmitted on said uplink are transmitted using a second radio access technology.

25. A method for using a wireless communication device, comprising:
using processing logic to:
  use first and second antennas to receive data signals on a downlink and to transmit data signals on an uplink, wherein said data signals received on said downlink are received on a first set of multiple carrier frequencies and said data signals transmitted on a second set of multiple carrier frequencies;

process a plurality of said received signals on said downlink to generate a plurality of antenna parameter measurements derived from multiple correlations of a known reference sequence of data signals transmitted on said downlink;

use said plurality of antenna parameter measurements to select said first antenna or said second antenna for transmitting data signals by said communication device on said uplink; and use an offset corresponding to a power difference favoring said first or second antenna to select said first antenna or said second antenna for transmitting data signals by said communication device on said uplink, wherein said offset is signaled to the communication device, wherein a ratio of transmitted signal power between said first and second antennas is variable during a predetermined time interval, and wherein the ratio of the transmitted signal power between said first and second antenna is determined by the usage mode of the user equipment device.

26. The method for using a wireless communication device of claim 25, wherein said processing logic averages said antenna parameter measurements over a plurality of data subframes.

27. The wireless communication device of claim 25, wherein the processing of said received signal on said downlink further comprises computing desired user power or total received signal power.

28. A method for using a wireless communication device, comprising:

using processing logic to:
use said first and second antennas to receive signals on a downlink;
process a plurality of said received signals on said downlink to generate a plurality of antenna parameter measurements derived from multiple correlations of a known reference sequence of data signals transmitted on said downlink; and
use said first and second antennas to transmit data signals on an uplink, wherein said plurality of antenna parameter measurements are used by said processing logic to split transmitted signal power between said first and second antenna, wherein the ratio of transmitted signal power between said first and second antennas is variable during a predetermined time interval, and wherein the ratio of the transmitted signal power between said first and second antenna is determined by the usage mode of the communication device.

29. The method for using a wireless communication device of claim 28, wherein said processing logic averages said antenna parameter measurements over a plurality of data subframes.

30. The method for using a wireless communication device of claim 28, wherein the ratio of transmitted signal power between said first and second antennas is fixed during a second predetermined time interval.

31. The method for using a wireless communication device of claim 28, wherein the ratio of transmitted signal power between said first and second antennas is determined based on desired received power on said first antenna and said second antenna.

32. The method for using a wireless communication device of claim 28, wherein the ratio of the transmitted signal power between said first and second antenna is determined by predetermined specific absorption rate parameters.

* * * * *